(12) United States Patent
Ogura

(10) Patent No.: US 8,698,441 B2
(45) Date of Patent: Apr. 15, 2014

(54) SERVO CONTROL DEVICE AND RECORDING MEDIUM

(75) Inventor: Yoshimitsu Ogura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 657 days.

(21) Appl. No.: 13/012,064

(22) Filed: Jan. 24, 2011

(65) Prior Publication Data
US 2011/0187305 A1  Aug. 4, 2011

(30) Foreign Application Priority Data

Feb. 4, 2010  (JP) ................................. 2010-023416

(51) Int. Cl.
*G05B 11/01* (2006.01)
(52) U.S. Cl.
USPC ........... 318/561; 318/266; 318/466; 318/480; 318/560
(58) Field of Classification Search
USPC .......... 318/560, 561, 720, 721, 266, 466, 480
See application file for complete search history.

(56) References Cited

U.S. PATENT DOCUMENTS

| | | | | |
|---|---|---|---|---|
| 4,261,039 A * | 4/1981 | Baker et al. | ..................... | 358/1.5 |
| 4,275,968 A * | 6/1981 | Irwin | ............................. | 400/582 |
| 4,299,308 A * | 11/1981 | Shung et al. | .................. | 187/316 |
| 4,300,660 A * | 11/1981 | Schoenmann et al. | ........ | 187/316 |
| 4,300,662 A * | 11/1981 | Hmelovsky | .................... | 187/316 |
| 4,300,663 A * | 11/1981 | Hmelovsky et al. | .......... | 187/316 |
| 4,305,480 A * | 12/1981 | Hmelovsky | ................... | 187/316 |
| 4,305,481 A * | 12/1981 | Hmelovsky et al. | .......... | 187/316 |
| 4,342,378 A * | 8/1982 | Hmelovsky | .................... | 187/316 |
| 4,342,379 A * | 8/1982 | Games et al. | ................. | 187/316 |
| 4,959,598 A * | 9/1990 | Yoshida et al. | ................ | 318/599 |
| 5,556,492 A * | 9/1996 | Vonderhorst et al. | ........... | 156/64 |
| 6,794,840 B2 * | 9/2004 | Muroi et al. | ................... | 318/466 |
| 7,038,404 B2 * | 5/2006 | Kameyama | ..................... | 318/34 |
| 7,195,239 B2 * | 3/2007 | Saito et al. | ..................... | 271/256 |
| 7,261,480 B2 * | 8/2007 | Hampton et al. | ............. | 400/283 |
| 7,449,850 B2 * | 11/2008 | Muroi | ............................ | 318/270 |
| 8,228,512 B2 * | 7/2012 | Ogura et al. | .................. | 358/1.12 |
| 8,299,745 B2 * | 10/2012 | Tsuchiya | ....................... | 318/696 |
| 2001/0049754 A1 * | 12/2001 | Kawase | .......................... | 710/22 |
| 2002/0093301 A1 * | 7/2002 | Itami et al. | ..................... | 318/452 |
| 2003/0020423 A1 * | 1/2003 | Kameyama | .................... | 318/560 |
| 2003/0189414 A1 * | 10/2003 | Muroi et al. | ................... | 318/254 |
| 2003/0222610 A1 * | 12/2003 | Whinnery | ...................... | 318/362 |
| 2003/0222614 A1 * | 12/2003 | Whinnery et al. | ............. | 318/461 |
| 2004/0065498 A1 * | 4/2004 | Onozawa et al. | ............. | 180/286 |
| 2005/0162115 A1 * | 7/2005 | Pendergrass | .................. | 318/480 |
| 2005/0179409 A1 * | 8/2005 | Honma et al. | ................... | 318/62 |

(Continued)

FOREIGN PATENT DOCUMENTS

| | | |
|---|---|---|
| JP | 2004-013810 | 1/2004 |
| JP | 2004-357374 | 12/2004 |
| JP | 2006-262571 | 9/2006 |

*Primary Examiner* — Paul Ip
(74) *Attorney, Agent, or Firm* — IPUSA, PLLC

(57) ABSTRACT

A disclosed servo control device includes a servo control unit configured to control a driving unit for driving a driven body with servo control, and a changing unit configured to change a timing of ending the servo control in response to stop position accuracy for a target stop position of the driven body when the driven body is driven to move, wherein the servo control unit detects an error between the target stop position and an actual stop position of the driven body, and corrects the timing of ending the servo control using the detected error.

15 Claims, 11 Drawing Sheets

(56) References Cited

U.S. PATENT DOCUMENTS

| | | | |
|---|---|---|---|
| 2005/0275363 A1* | 12/2005 | Honma et al. | 318/280 |
| 2006/0012325 A1* | 1/2006 | Robb et al. | 318/466 |
| 2006/0044334 A1* | 3/2006 | Fujita et al. | 347/12 |
| 2006/0082337 A1* | 4/2006 | Fitzgibbon et al. | 318/283 |
| 2007/0075664 A1* | 4/2007 | Muroi | 318/270 |
| 2008/0049062 A1* | 2/2008 | Igarashi | 347/16 |
| 2008/0225070 A1 | 9/2008 | Morishita et al. | |
| 2009/0028586 A1 | 1/2009 | Yamashiro et al. | |
| 2009/0079376 A1* | 3/2009 | Fitzgibbon et al. | 318/452 |
| 2009/0237744 A1* | 9/2009 | Ogura et al. | 358/448 |
| 2010/0123751 A1* | 5/2010 | Iesaki | 347/16 |
| 2010/0196025 A1 | 8/2010 | Ogura | |
| 2011/0181918 A1* | 7/2011 | Motoyama | 358/404 |

\* cited by examiner

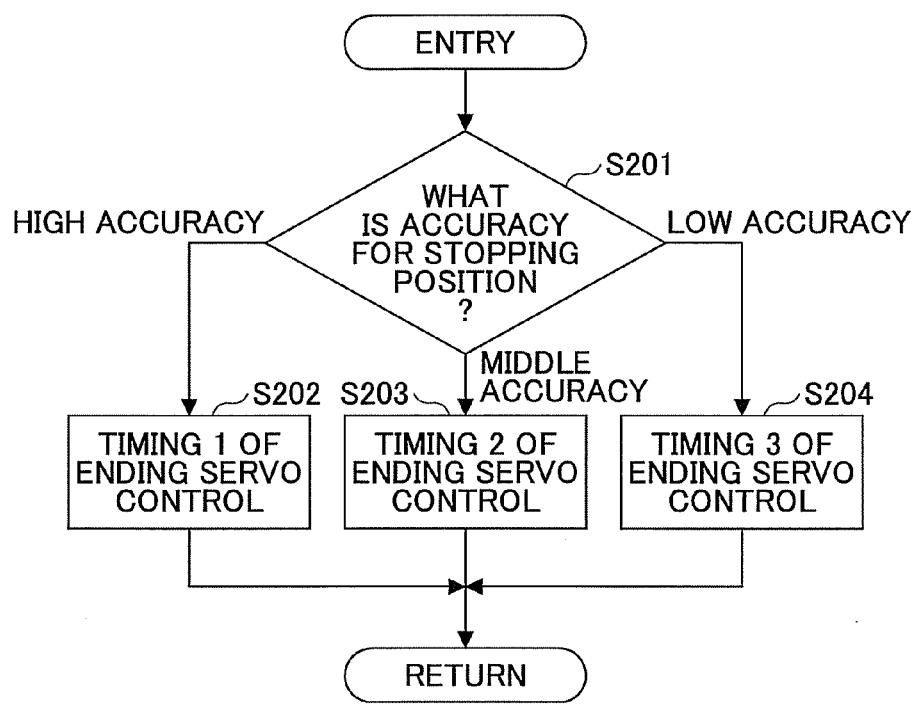
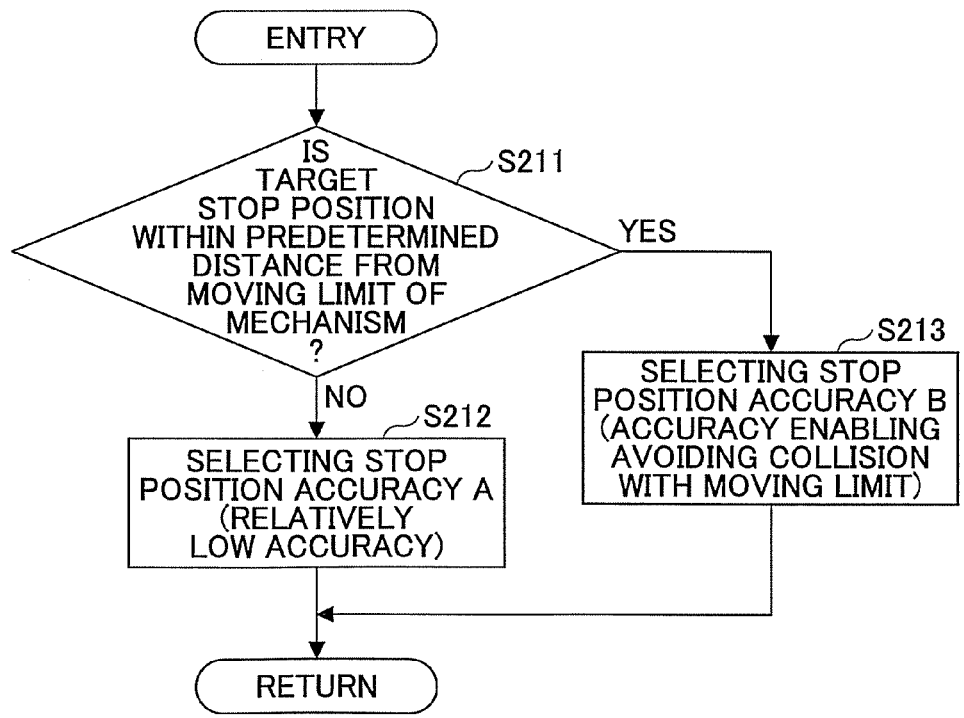

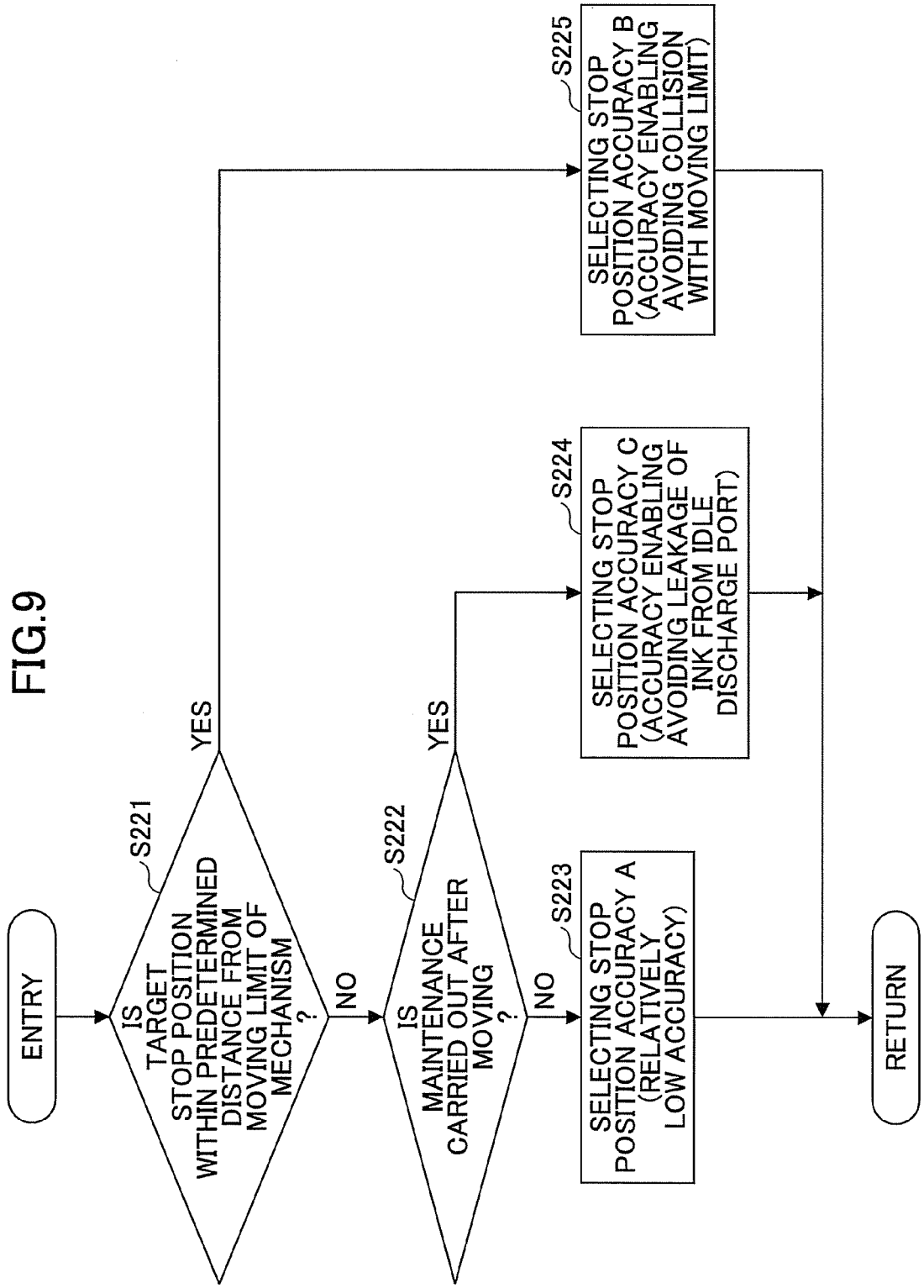

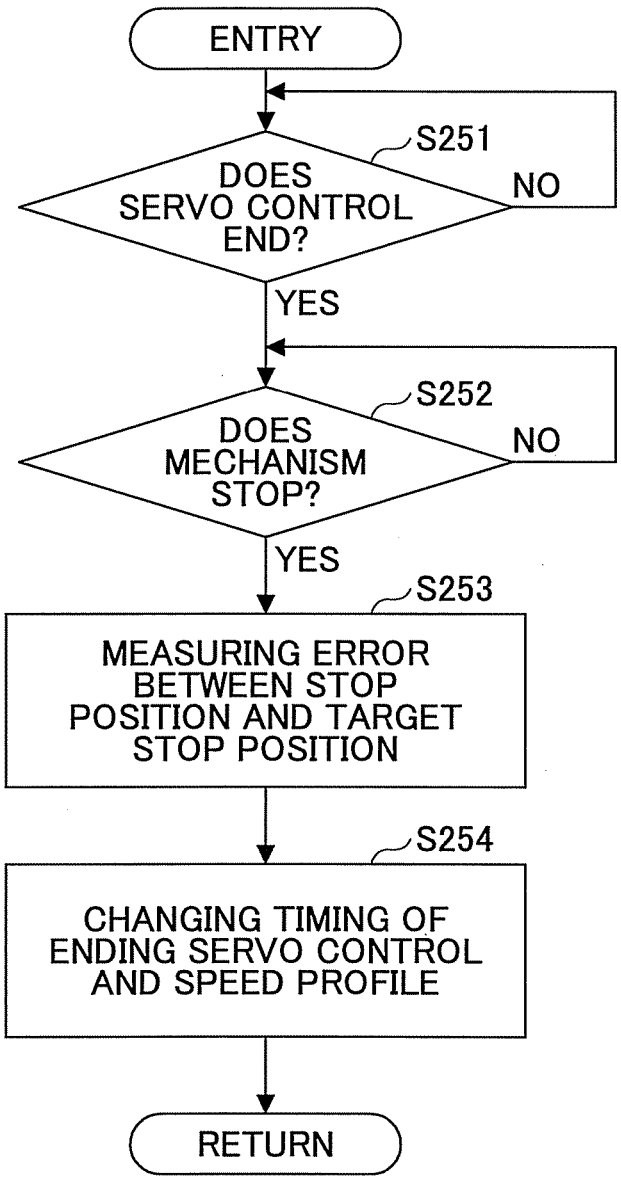

SERVO CONTROL DEVICE AND RECORDING MEDIUM

BACKGROUND OF THE INVENTION

1. Field of the Invention

The present invention relates to a servo control device for an image forming apparatus, and a recording medium.

2. Description of the Related Art

One type of an image forming apparatus such as a printer, a facsimile, a copier, a plotter, and a multi-function peripheral is an inkjet recording apparatus which discharges droplets of ink and records dots.

One type of an image forming apparatus such as a printer, a facsimile, a copier, a plotter, and a multi-function peripheral is an inkjet recording apparatus which uses a recording head discharging ink droplets. This inkjet recording apparatus discharges the ink droplets from the recording head to carried papers to thereby form images. Hereinafter, forming the images includes recording, printing characters, printing photos, printing images and so on. The image forming apparatus includes a serial-type image forming apparatus by which images are formed while the recording head moves in a main scanning direction and discharges ink droplets, and a line-type image forming apparatus by which images are formed while the recording head does not move and discharges ink droplets.

Hereinafter, "imaging apparatus of a liquid discharging type" is configured to discharge the droplet so as to hit a medium such as papers, textile threads, textiles, cloths, leathers, metals, plastics, glasses, lumber, and ceramics. Further, "imaging" means not only making of image such as a character, a letter and a figure but also causing droplets to hit the medium or giving an image such as a pattern to the medium. The "ink" is not limited to so-called inks and is an all-inclusive term of all kinds of liquids which can form images such as recording liquids, fixing agents, resins and so on. The material of "Paper" is not limited and may include OHP sheets and the above described clothes. The "Paper" is an all-inclusive term of recording media, recording papers, recording sheets and so on and represents any matter to which the ink droplets can be adhered. The "image" is not limited to a two-dimensional image, and may be an image given to a stereoscopic object or a three-dimensionally fabricated image.

Although an image forming apparatus having a liquid discharging head is exemplified, the image forming apparatus may not have the liquid discharging head and be another type.

For example, a carriage of a serial-type image forming apparatus has a liquid discharge head being an image forming unit. The liquid discharge head is moved in a main scanning direction and a recording medium is intermittently moved in a sub scanning direction orthogonal to the main scanning direction while liquid droplets are discharged from the liquid discharge head. Thus, an image is formed.

This serial-type image forming apparatus includes a linear encoder for detecting a position of the liquid discharge head. The linear encoder includes an encoder scale arranged along a main scanning direction of a carriage in which the liquid discharge head is installed and an encoder sensor for reading tick marks (position identifying unit) of the encoder scale. The linear encoder detects the position and speed of the carriage, and controls a moving speed of the carriage and driving of the liquid discharge head. The speed of the carriage may be subjected to a servo control of a DC motor.

As a method of controlling to stop the carriage with servo control, Patent Document 1 discloses reduction of vibration and noise by smoothing speed reduction immediately after starting to reduce the speed or speed reduction immediately before stopping the carriage. Patent Document 2 discloses a control method of increasing deceleration immediately after starting to reduce speed and decreasing deceleration immediately before stopping a carriage by making the speed be gradually decreased relative to a target speed in the deceleration and thereafter be continuously decreased without using a curve requiring complicated calculation. With Patent Document 3, when a mechanical characteristic of a carriage changes with a drive range or time degradation, by changing a speed profile in response to the mechanical characteristic, stability of driving is not spoiled to thereby obtain the maximum performance.

Patent Document 1: Japanese Laid-Open Patent Application No. 2004-357374

Patent Document 2: Japanese Laid-Open Patent Application No. 2006-262571

Patent Document 3: Japanese Laid-Open Patent Application No. 2004-013810

When the servo control is continuously carried out until detection of a mechanical stop of the carriage, and the servo control is finished after the detection of the mechanical stop, it is possible to highly accurately stop a carriage within a predetermined error range from the stop position. However, there needs to be a time for stopping the carriage. At this point, if the servo control is finished in a previous stage by planning the mechanical stop of the carriage, it is possible to shorten a time before the stop although accuracy of a target stop position becomes insufficient.

It is ordinarily unnecessary to assure the accuracy of the stop position is very high in moving the carriage while printing characters. However, during an idle discharge in printing characters which is carried out by discharging inks which do not contribute to image forming while the carriage is stopped over an idle discharge receiver in every predetermined printing period, the carriage is required to be highly accurately positioned relative to an opening portion of the idle discharge receiver, for example, in an order of ±300 µm. Therefore, all controls are carried out based on this accuracy.

Therefore, it may be useful if a servo control for an operation which does not require a very high stop position accuracy ends before a mechanical stop of the carriage. If the servo control for the operation which does not require the very high stop position accuracy ends before the mechanical stop of the carriage, it is possible to avoid a delay of the start time and therefore the performance of the image forming apparatus can be maintained.

SUMMARY OF THE INVENTION

Accordingly, embodiments of the present invention may provide a novel and useful servo control device, and a recording medium solving one or more of the problems discussed above.

More specifically, the embodiments of the present invention may provide a servo control device, for an image controlling device and a recording medium, with which a time until an end of the servo control is properly decreased to thereby enhance performance.

One aspect of the embodiments of the present invention may be to provide a servo control device including a servo control unit configured to control a driving unit for driving a driven body with a servo control; and a changing unit configured to change a timing of ending the servo control in response to a stop position accuracy for a target stop position of the driven body when the driven body is driven to move, wherein the servo control unit detects an error between the target stop position and an actual stop position of the driven body, and corrects the timing of ending the servo control using the detected error.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 7 is a flow chart illustrating a changeover process of the end of the servo control timing.

FIG. 8 is a flow chart illustrating a selection process of selecting stop position accuracies of Embodiment 2.

FIG. 9 is a flow chart illustrating a selection process of selecting stop position accuracies of Embodiment 3.

FIG. 14 is a flow chart of Embodiment 6.

DETAILED DESCRIPTION OF THE PREFERRED EMBODIMENTS

A description is given below, with reference to the FIG. 1 through FIG. 14 of embodiments of the present invention.

Reference symbols typically designate as follows:
3: Carriage;
4: Recording head;
12: Carrying belt;
13: Carrying roller;
23, 25: Encoder scale;
24, 26: Encoder sensor; and
200: Control unit.

Embodiment 1

Figure 1:
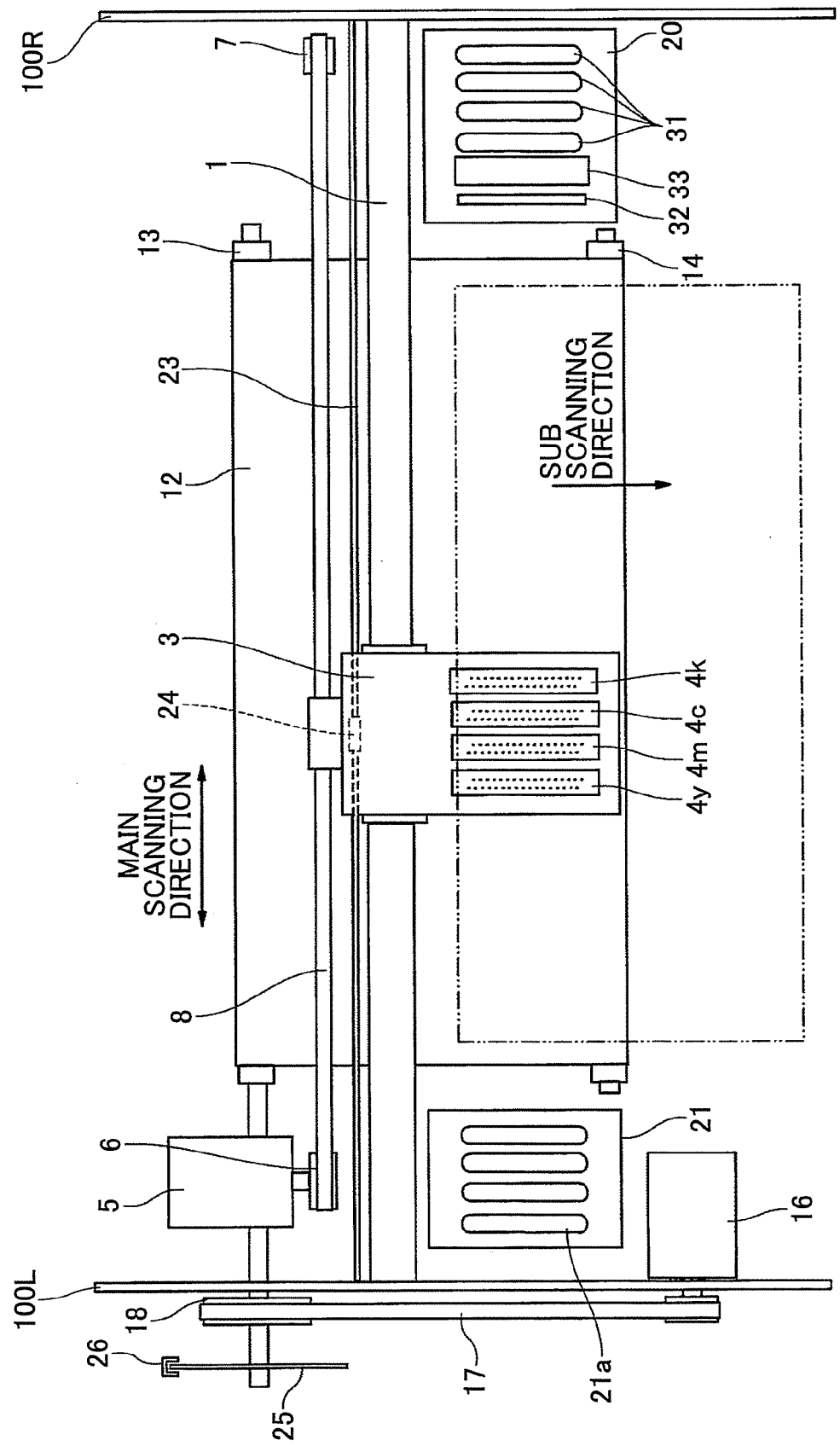
FIG. 1 is a plan view of an inkjet recording apparatus as an image forming apparatus of an Embodiment.
Figure 2:
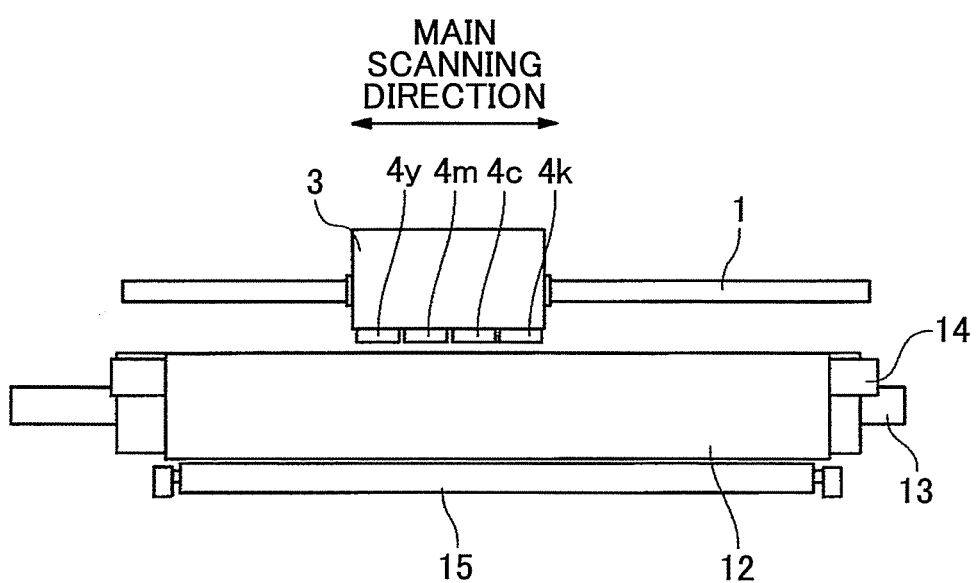
FIG. 2 is a front view of the inkjet recording apparatus of the Embodiment.

A description will now be given, with reference to FIG. 1 through FIG. 14, of the Embodiments. Referring to FIG. 1 and FIG. 2, an inkjet recording apparatus as the image forming apparatus of Embodiment 1 is described. FIG. 1 is a plan view schematically illustrating the inkjet recording apparatus. FIG. 2 is a front view illustrating the inkjet recording apparatus. In the inkjet recording apparatus, a carriage 3 is held by a main guide rod 1 bridging between right and left side plates 100L and 100R and a sub guide member (not illustrated) so that the carriage 3 is freely slidable. The carriage 3 is moved in the main scanning direction via a timing belt 8 between a driving pulley 6 and a driven pulley 7 by a main scanning motor 5 while the carriage is being driven.

The carriage 3 has recording heads 4y, 4m, 4c and 4k (collectively referred to as recording head 4) which include liquid discharge heads for discharging ink droplets of various colors of yellow (Y), magenta (M), cyan (C) and black (K), respectively. The liquid discharge heads are arranged in a sub scanning direction orthogonal to a main scanning direction. The discharging direction of the ink droplets are downward.

The liquid discharge heads included in the recording head 4 have pressure generating units for generating a pressure for discharging droplets such as a piezoelectric actuator like a piezo element; a thermal actuator utilizing a phase change caused by film boiling of a liquid using an electro-thermal conversion element like a resistance heater (heat element); a shape-memory-alloy actuator using a phase change caused by a temperature change; and a static actuator using electrostatic force.

Meanwhile, there is provided a carrying belt 12 as a carrying unit for attracting a paper and carrying the paper at a position facing the recording head 4. The carrying belt 12 is an endless belt and bridges a carrying roller 13 and a tension roller 14. Thus, the carrying belt 12 turns in a belt carrying direction (sub scanning direction) while being charged by a charging roller 15.

The carrying belt 12 is rotated in the sub scanning direction by a sub scanning motor 16 via a timing belt 17, a timing pulley 18 and the carrying roller 13.

A maintenance and recovery mechanism 31 for maintaining and recovering the recording head 4 is arranged on one side of the carrying belt 12 and one side of the carriage 3 along the main scanning direction. An idle discharge receiver 21 used for carrying out idle discharge is arranged on the other side of the carrying belt 12.

The maintenance and recovery mechanism 20 includes four cap members 31 for capping nozzle faces of the recording head 4 where nozzles are formed, a wiper member 32 for wiping the nozzle faces, and an idle discharge receiver 33 for receiving droplets (hereinafter referred to as an idle discharge droplet) which do not contribute to image forming.

An encoder scale 23 bridges between side plates along the main scanning direction of the carriage 3. The encoder scale 23 has a predetermined pattern such as a position identifying unit, tick marks, and slits. An encoder sensor 24 made of a transmission photosensor for reading the slits or the like of the encoder scale 23 is installed in the carriage 3. The encoder scale 23 and the encoder sensor 24 in combination function as a liner encoder (main scanning encoder) for detecting movement of the carriage 23.

An encoder scale (code holes) 25 demonstrating a high resolution is attached to an axle of the carrying roller 13. An encoder sensor 26 including a transmission photosensor for detecting patterns formed in the encoder scale 25 is provided. The encoder scale 25 and the encoder sensor 26 in combination function as a rotary encoder (sub scanning encoder) for detecting the amount and the position of the movement of the carrying belt 12.

In the image forming apparatus constructed as above, a paper is fed from a paper feed tray (not illustrated) and attracted by the charged carrying belt 12. When the carrying belt 12 is rotated, the paper is carried in the sub scanning direction. By driving the recording head 4 in response to an image signal while making the carriage move in the main scanning direction, a line of the ink droplets is discharged on the stopped paper to record the line. After carrying the paper by a predetermined amount in the sub scanning direction, the next line is recorded. After receiving a record end signal or a signal indicating that an end of the paper reaches a recording area, the recording operation is completed and the paper is ejected onto a paper ejection tray.

Figure 3:
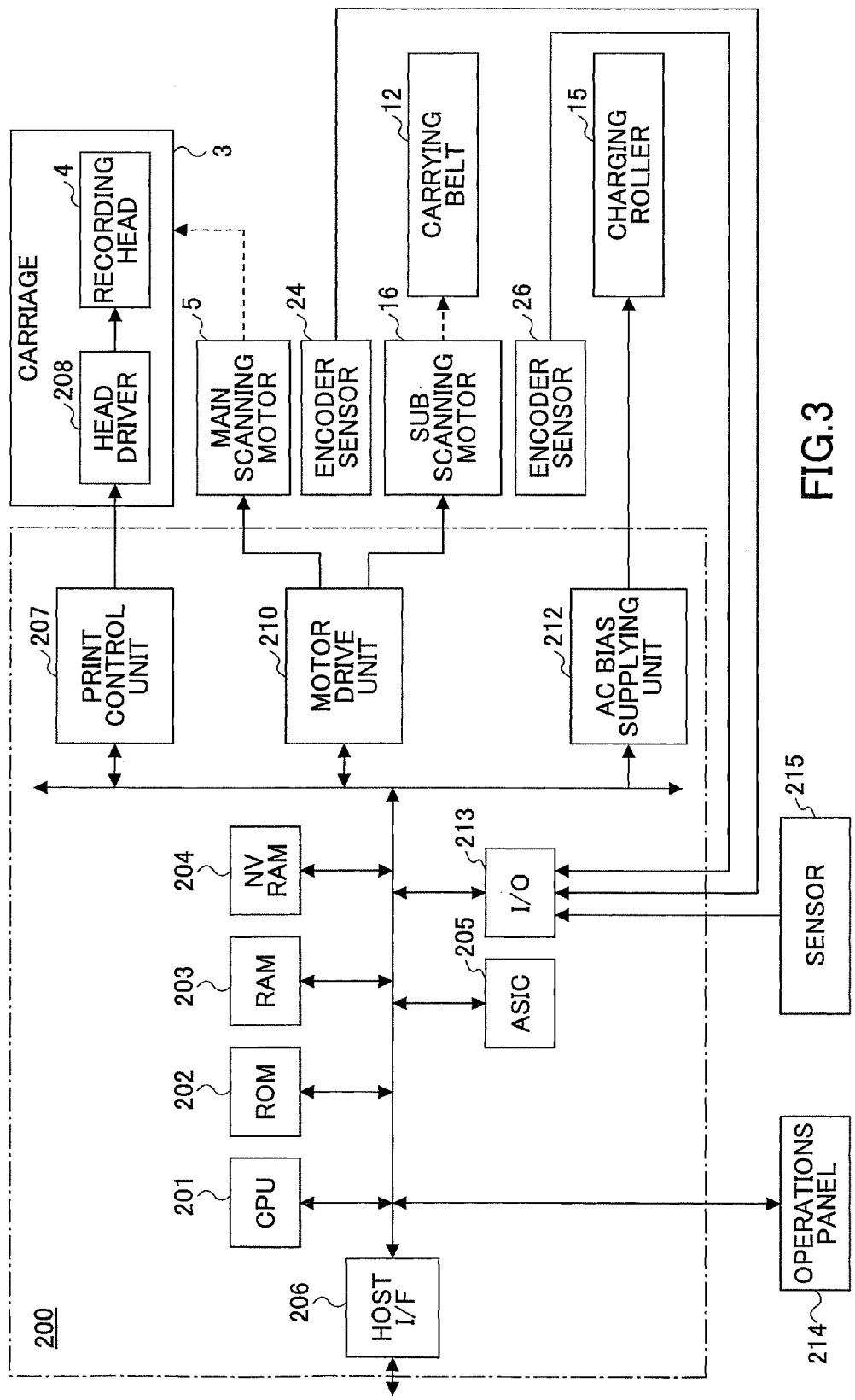
FIG. 3 is a block diagram schematically illustrating a control unit of the inkjet recording apparatus of the Embodiment.

Referring to FIG. 3, a control unit of the image forming apparatus is described. FIG. 3 is a block chart illustrating an overall structure of the control unit. The control unit 200 controls the entire image forming apparatus. The control unit 200 includes a CPU 201 for executing processes and controlling movement of the carriage; various program recording media for storing programs to be executed by the CPU 201, a ROM 202 for storing other fixed data, such as a RAM 203 temporarily storing image data and so on, and a non-volatile memory 204 which can be rewritten for holding data while the image forming apparatus is turned off; and an ASIC 205 for executing various signal processes of the image data, rearranging the images, and processing input and output signals for controlling the entire image forming apparatus.

The control unit 200 includes an I/F 206 for sending and receiving data and signals to and from a host, a data transferring unit (not illustrated) for controlling a drive of the recording head 4, a print control unit 207 including a driving waveform generating unit, a head driver (driver IC) 208 for driving the recording head 4 provided in the carriage 3, a motor drive unit 210 for driving the main scanning motor 5 and the sub scanning motor 16, an AC bias supplying unit 212 for supplying an AC bias to the charging roller 15, an I/O 213 for receiving detected signals from various sensors 215 such as a temperature sensor which detects an ambient temperature causing a positional shift of formed dots, and so on. The control unit 200 is connected to an operations panel 214 for inputting and displaying necessary information.

The control unit 200 receives image data or the like from the host side such as an information processing apparatus like a personal computer, an image reading apparatus like an image scanner, and an imaging apparatus like a digital camera by the host I/F 206 via a cable or a network.

The CPU 201 of the control unit 200 reads print data inside a receive buffer included in the I/F 206 and analyzes the read print data. The ASIC 205 carries out necessary image processing and rearrangement of the data. The print control unit 207 sends the processed or rearranged image data to the head driver 208. Dot pattern data used to output the image are generated by a printer driver on the host side.

The print control unit 207 transfers not only the above image data of serial data to the head driver 208 but also a transfer clock, a latch signal, a droplet control signal (mask signal) or the like which is necessary for transferring and confirmation of transferring of the image data. Further, the print control unit 207 includes a driving waveform generating unit including a D/A converter for converting pattern data of the driving signal stored in the ROM, a voltage amplifier, a current amplifier, or the like and a drive waveform selecting unit for giving the driving waveform to the head driver 208. The print control unit 207 generates the driving waveform including a driving pulse (driving signal) or plural driving pulses (driving signals) and outputs the driving waveform to the head driver 208.

The head driver 208 drives the recording head 4 by selectively applying the driving signal having the driving waveform which is supplied from the print control unit 207 based on the image data corresponding to one line of the recording head input in serial form to driving elements. The driving elements like the above described piezo element generate energy for discharging droplets inside the recording head 4 when the driving signal is applied to the driving elements. At this time, by selecting the driving pulses forming the driving waveform, it is possible to discharge various dots having different sizes such as a large droplet (large dot), a middle droplet (middle dot), and a small droplet (small dot).

The CPU 201 drives the main scanning motor 5 via the motor driving unit 210 by calculating a driving output value (control value) for the main scanning motor 5 based on a speed detection value and position detection value both obtainable by sampling a detection pulse from the encoder sensor 24 forming the linear encoder and a speed target value and position target value both obtained from previously stored speed and position profiles. The sub scanning motor 16 is driven via the motor drive unit 210 and a motor driver based on a driving output. In a similar manner to the above, the driving output (control value) for the sub scanning motor 16 is calculated based on a speed detection value and position detection value both obtainable by sampling a detection pulse from the encoder sensor 26 forming the rotary encoder and a speed target value and position target value both obtained from previously stored speed and position profiles. Then, the sub scanning motor 16 is driven based on the obtained speed detection value and position detection value.

Figure 4:
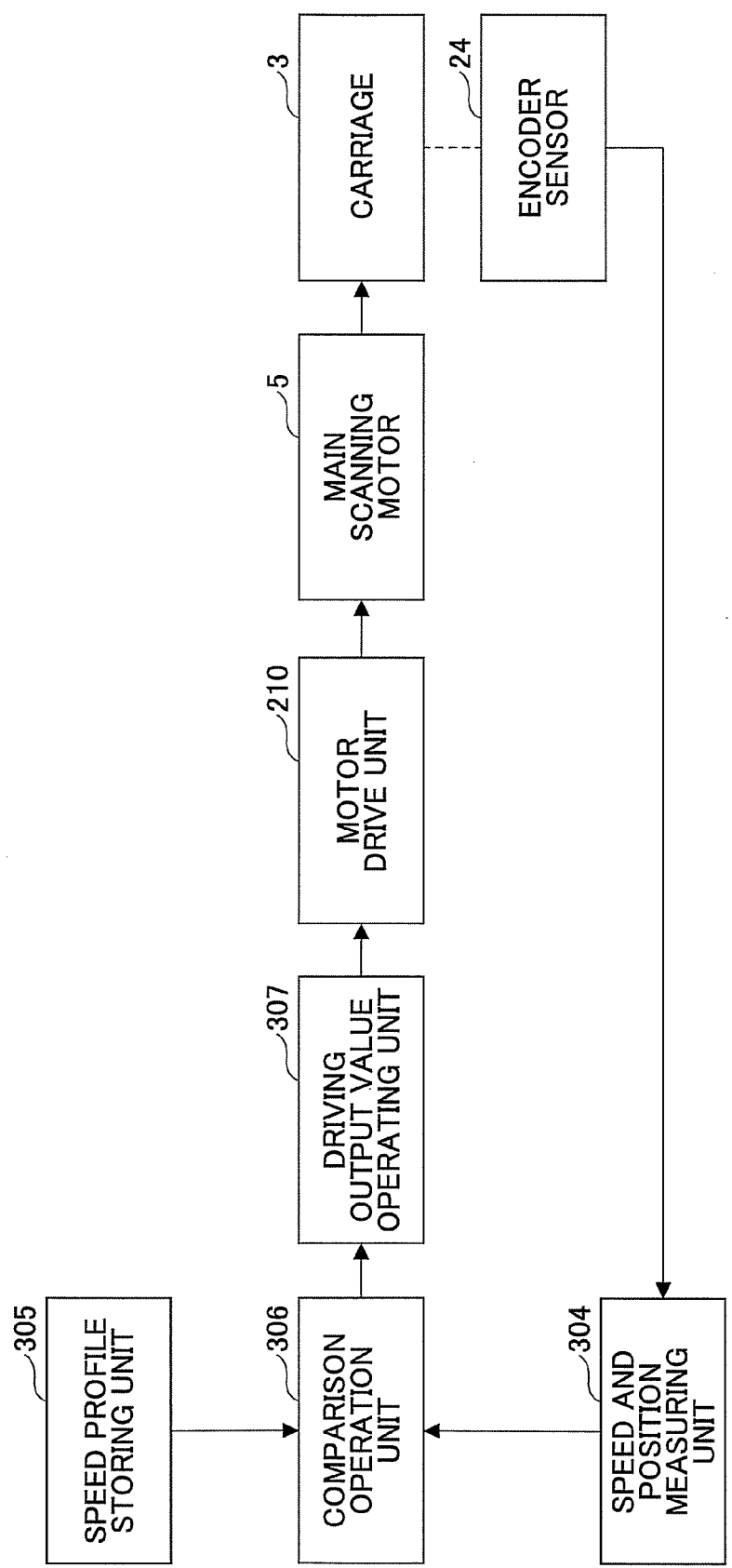
FIG. 4 is a block diagram of the servo control device included in the control unit.

Subsequently, referring to the block chart of FIG. 4, the servo control of the carriage with the control unit which corresponds to the servo control device is described. The servo control unit includes a speed and position measuring unit 304 for processing the detection pulse output from the encoder sensor 24 in response to the moving speed and moving distance of the carriage 3 and calculating the speed detection value and the position detection value, a speed profile storing unit 305 for storing a speed profile including a target speed (speed target value), a comparison operation unit 306 for calculating a deviation between the speed detection value from the speed and position measuring unit 304 and the speed target value from the speed profile storing unit 305, a driving output value operating unit 307 for calculating a proportional integral (PI) value (driving output value) used to drive the main scanning motor 5 based on a deviation calculated by the comparison operation unit 306, and the motor drive unit 210 (driver) for driving the main scanning motor 5 in response to the driving output value output from the driving output value operating unit 307. The speed and position measuring unit 304, the comparison operation unit 306, and the driving output value operating unit 307 are embodied by a program executed by the CPU 201.

The control unit 200 receives detection signals from the various sensors 215 and is connected to the operations panel 214 for inputting and displaying information necessary for the image forming apparatus.

Figure 5:
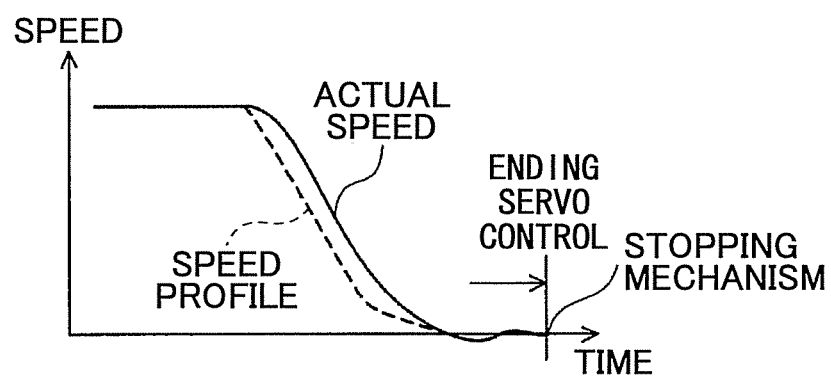
FIG. 5 is a graph for illustrating an example timing of an end of the servo control of Embodiment 1.
Figure 6:
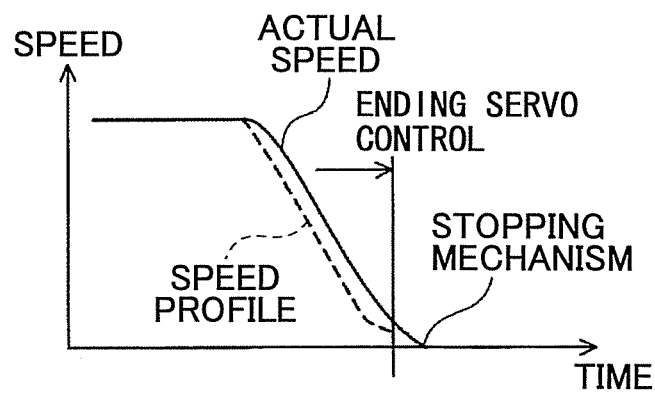
FIG. 6 is a graph for illustrating another example timing of an end of the servo control of Embodiment 1.

Referring to FIG. 5 to FIG. 7, Embodiment 1 is described next.

An example timing of ending the servo control is when the carriage 3 mechanically stops as illustrated in FIG. 5. By ending the servo control at the timing, it is possible to certainly stop the carriage 3 within a predetermined error range from the target stop position. However, a relatively long time is required until the carriage completely stops.

Another timing of ending the servo control is when the carriage 3 still has a certain speed as illustrated in FIG. 6. After the servo control is ended, the moving carriage 3 is mechanically decelerated to be stopped. By ending the servo control at this timing, a distance error of the carriage from the target stop position may not be satisfactory. However, since the control time at around the speed of zero is unnecessary, the time until the stop is relatively shortened.

When the timing of ending the servo control is fixed to any one of the timings illustrated in FIG. 5 and FIG. 6, there may occur inconvenience in which a necessary stopping accuracy is not achieved or an additional time passes for unnecessary stopping control.

Referring to FIG. 7 of Embodiment 1, when the carriage 3 is driven, stop position accuracy for the stop position is determined in step S201. When the stop position accuracy is high, the servo control is ended at a timing 1 of ending the servo control in step S202. When the stop position accuracy is at a middle level, the servo control is ended at a timing 2 of ending the servo control in step S203. When the stop position accuracy is low, the servo control is ended at a timing 3 of ending the servo control in step S204. The timing 1 of ending the servo control is the latest, the timing 3 of ending the servo control is the earliest, and the timing 2 of ending the servo control is between the timing 1 and the timing 3.

As described, by changing the timings of ending the servo control, it is possible to properly decrease the driving time and enhance the performance. There are three stages of high, middle and low in the stop position accuracy. However, the number of the stages may be more than three. The determination of the stop position accuracy required for the stop position is described later.

Embodiment 2

Referring to a flow chart of FIG. 8, Embodiment 2 is described. It is determined whether the target stop position of the carriage 3 is within a predetermined distance from the moving limit of the mechanism in step S211. When the target stop position is not within the predetermined distance from the moving limit of the mechanism, namely the target stop position is in the vicinity of the moving limit restricted by a mechanical component such as the side plate, the carriage 3 may collide with the mechanical component such as the side plate to thereby break colliding parts without maintaining a sufficient stop position accuracy.

When the target stop position of the carriage 3 is in the vicinity of the moving limit, the servo control is ended at the timing of ending the servo control with which a high stop position accuracy is secured.

Embodiment 3

Referring to a flow chart of FIG. 9, Embodiment 3 is described. It is determined whether the target stop position of the carriage 3 is within a predetermined distance from the moving limit of the mechanism in step S221. At this time, when the target stop position of the carriage is not within the predetermined distance from the moving limit of the mechanism, it is determined whether a maintenance and recovery operation (maintenance) of nozzles of the recording head 4 is to be carried out in step S222.

When the maintenance is not to be carried out after ceasing to moving the carriage, a stop position accuracy A (relatively low stop position accuracy) is selected in step S223. When the maintenance is to be carried out after moving the carriage, a stop position accuracy C (position accuracy with which inks may not veer from an opening portion 21a of an idle discharge receiver 21) is selected in step S224.

Meanwhile, when the target stop position is within the predetermined distance from the moving limit of the mechanism, a stop position accuracy B (position accuracy with which carriage 3 may not collide with the mechanical components causing the moving limit) is selected in step S225.

When the recording head 4 is maintained after moving the carriage, droplets which do not contribute to image forming are discharged toward the opening portion 21a of the idle discharge receiver 21 from the recording head 4. If the stop position shifts due to this discharging action, the droplets are discharged to locations other than the opening portion 21a to thereby stain the inside of the image forming apparatus. In order to avoid the stain, the stop position accuracy of the carriage 3 is determined to be high enough to cause no positional shift in discharging the droplets.

Embodiment 4

Figure 10:
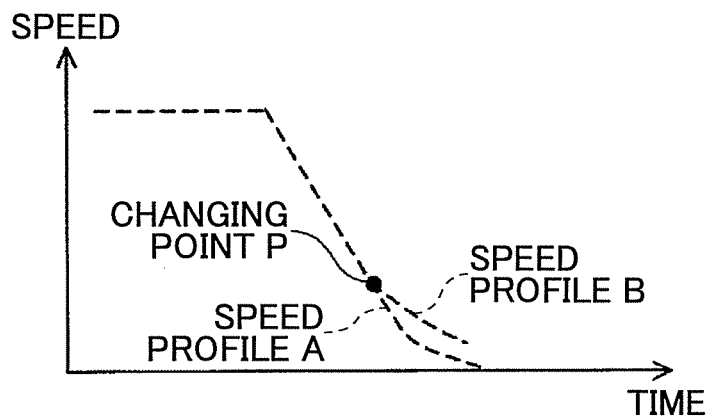
FIG. 10 is a graph for illustrating a speed profile of Embodiment 4.
Figure 11:
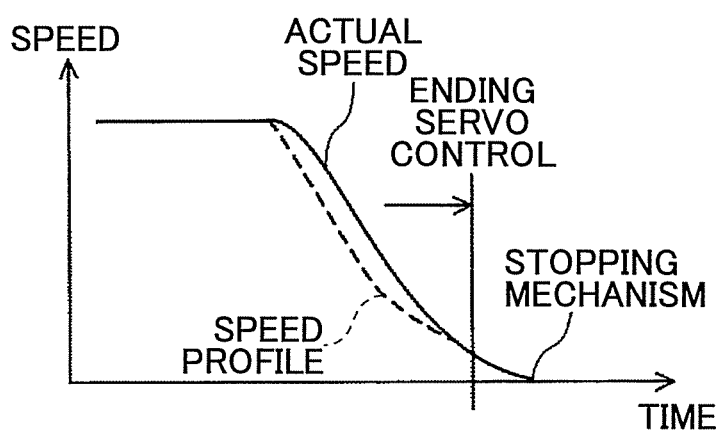
FIG. 11 is a graph for illustrating a speed change in using the speed profile of FIG. 10.
Figure 12:
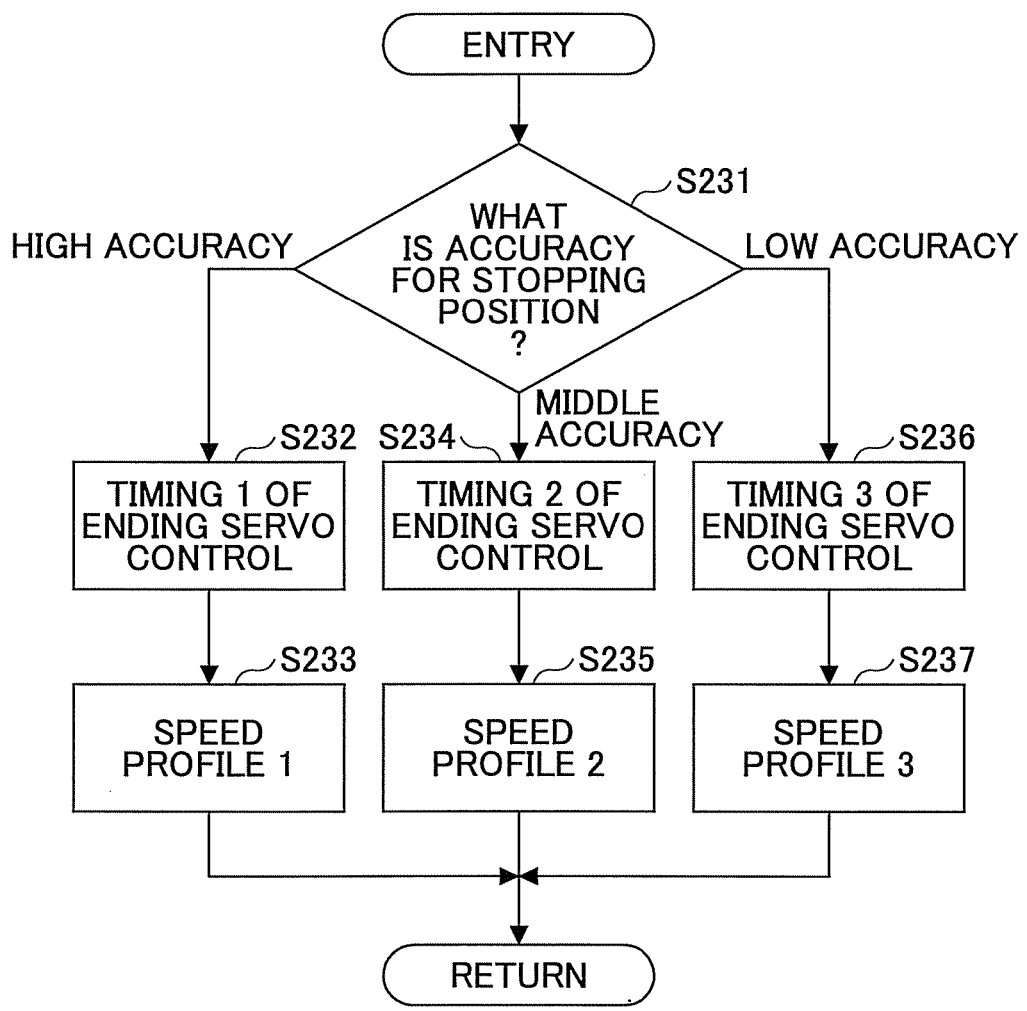
FIG. 12 is a flow chart illustrating the timing of the end of a servo control timing and a changeover process of speed profiles.

Referring to FIG. 10 to FIG. 12, Embodiment 4 is described next. First, a relationship between the timing of ending the servo control and the speed profile is described. For example, when the carriage 3 is stopped with a high deceleration, the image forming apparatus vibrates. Therefore, the speed profile is set so that the deceleration is lowered immediately before stopping as illustrated in FIG. 5.

When the speed profile the same as that illustrated in FIG. 5 is used and only the timing of ending the servo control is set to be that illustrated in FIG. 6, an area (time) is shortened in which the deceleration immediately before stopping the carriage takes place. Therefore, the carriage relatively suddenly stops thereby causing the vibration of the image forming apparatus.

Referring to FIG. 10, a speed profile (hereinafter, referred to as speed control A) in a case of continuing the servo control until the carriage 3 stops and a speed profile (hereinafter, referred to as speed control B) in a case of ending the servo control before the carriage 3 stops are previously stored in the speed profile storing unit 305.

Referring to FIG. 11, when the timing of ending the servo control occurs while the carriage 3 moves and has not stopped, the speed profile A is changed to the speed profile B. Then, the deceleration immediately before the stop can be lowered thereby suppressing the vibration of the image forming apparatus.

Referring to FIG. 12, a process of changing the timings of ending the servo control and the speed profiles is described.

First, the accuracy (stop position accuracy) required for the stop position is determined in step S231. When the stop position accuracy is high, the timing 1 of ending the servo control is selected in step S232, and further the speed profile 1 is selected in step S233. When the stop position accuracy is at a middle level, the timing 2 of ending the servo control is selected in step S234, and further the speed profile 2 is selected in step S235. When the stop position accuracy is low, the timing 3 of ending the servo control is selected in step S236, and further the speed profile 3 is selected in step S237.

Embodiment 5

Figure 13:
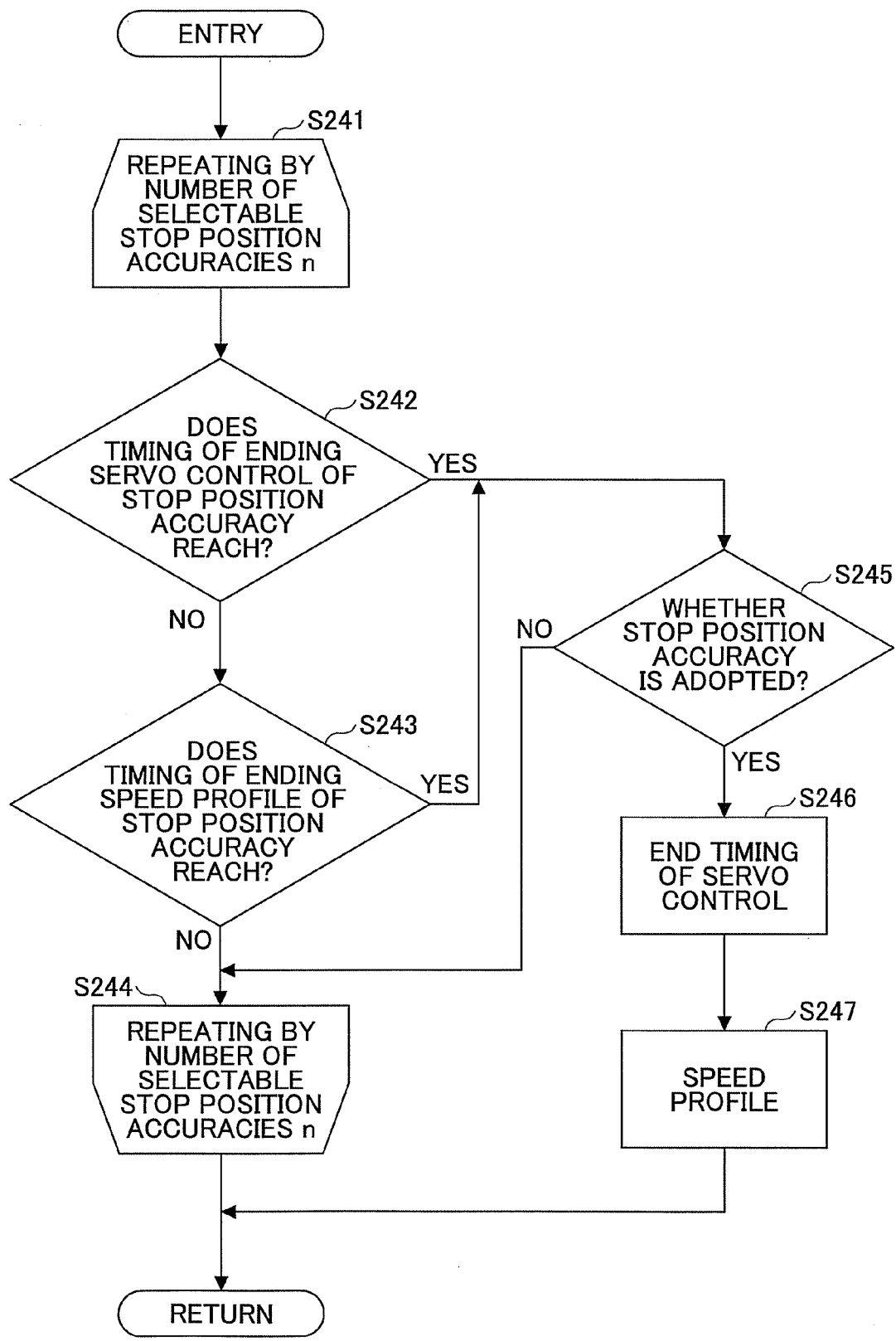
FIG. 13 is a flow chart of Embodiment 5.

Referring to a flow chart of FIG. 13, Embodiment 5 is described. With Embodiments 1 to 4, if the target stop position is changed while the carriage 3 moves, it becomes impossible to deal with the change when the stop position accuracy is determined before the carriage starts to move.

Therefore, it is preferable to determine the stop position accuracy as late as possible, for example immediately before the target stop position. With Embodiment 1, it is possible to change the ending timings illustrated in one of FIG. 5 and FIG. 6 until the timing of ending the servo control illustrated in FIG. 5. With Embodiment 4, one of the speed profiles A and B may be selected before the timing of the changing point P of the speed profile illustrated in FIG. 10.

Referring to FIG. 13, the determinations of the stop position accuracies are repeated by the number n of the selectable stop position accuracies in step S241. Then, it is determined whether the stop position accuracies n satisfy the timing of ending the servo control in step S242. When all the stop position accuracies n do not satisfy the timing of ending the servo control, it is determined whether the timing of changing the speed profile has been reached in step S243.

At this time, when any one of the timing of ending the servo control for the stop position accuracy and the timing of changing the speed profile of the stop position accuracy has not been reached, it is repeatedly checked whether any one of the timings has been reached by the number n of the selectable stop position accuracies in step S244.

Meanwhile, when the timing of ending the servo control of the stop position accuracy has been reached or the timing of changing the speed profile of the stop position accuracy has been reached, it is determined whether another stop position accuracy is to be adopted in step S245.

When the other stop position accuracy is to be adopted, the timing of ending the servo control corresponding to the other stop position accuracy is selected in step S246, and the speed profile corresponding thereto is selected in step S247. When the other stop position accuracy is not adopted, it is repeatedly checked whether the timing of ending the servo control has been reached by the number of the further selectable stop position accuracies in step S244.

As described, it becomes possible to select an appropriate way of stopping the carriage even when the stop position accuracy is changed by determining whether the stop position accuracy is adopted before reaching the timing of ending the servo control or the timing of changing the speed profile.

The changing point P illustrated in FIG. 10 corresponds to, for example, the timing of changing the speed profile in step S243. At the changing point P, one of all the selectable speed profiles is changed to another one of the rest of the selectable speed profiles. All the selectable speed profiles may be fixedly predetermined, or may be flexibly changeable upon learning, which is described in reference to Embodiment 6 below.

Embodiment 6

Referring to a flow chart of FIG. 14, Embodiment 6 is described.

As described, when the servo control is ended while the carriage 3 still moves, it is not possible to secure the accuracy of the stop position. By acquiring an error between a position where the carriage 3 actually stops and the target stop position, by learning for correction based on the acquired error, and correcting the timing of ending the servo control and the speed profile, it is possible to make the stop position be closer to the target stop position.

Referring to FIG. 14, it is determined whether the servo control ends in step S251. When the servo control has ended, it is detected and determined whether the carriage has mechanically stopped in step S252. When the carriage has mechanically stopped, an error between the stop position and the target stop position is measured in step S253. Based on the measured error, at least one of the timing of ending the servo control and the speed profile is changed in step S254.

The mechanical stop of the carriage 3 in step S252 may be determined when the carriage 3 remains in a predetermined position for a predetermined time.

With Embodiments 1 to 6, the servo control device controlling the carriage has been exemplified and described.

However, Embodiments 1 to 6 may also be applicable to a servo control device which controls a carrying roller driving a carrying belt and another servo control device for a reading unit of a scanner in an image forming apparatus in a similar manner thereto. The processes of changing over the timing of ending the servo control and the speed profile may be carried out by a computer using the above-mentioned program. The program may be stored in a recording medium, a non-transitory recording medium, or the like and provided, or provided through a network as downloadable software.

According to the image forming apparatus, servo control device, and recording medium of Embodiments 1 to 6, the timing of ending the servo control can be changed over in response to the stop position accuracy required by the carriage, the carrying unit, and the target stop position. Therefore, a time until the end of the servo control can be appropriately reduced to thereby enhance the performance of the image forming apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

This patent application is based on Japanese Priority Patent Application No. 2010-023416 filed on Feb. 4, 2010, the entire contents of which are hereby incorporated herein by reference.

What is claimed is:

1. A servo control device comprising:
a driven body which is configured to form an image;
a driving unit which drives the driven body;
a servo control unit configured to control the driving unit for driving the driven body with a servo control; and
a switching unit configured to switch a timing of ending the servo control in response to a stop position accuracy for a target stop position of the driven body when the driven body is driven to move.

2. The servo control device according to claim 1, wherein the servo control device is used for an image forming apparatus.

3. The servo control device according to claim 1, wherein the driven body is a carrying unit.

4. The servo control device according to claim 1, wherein the servo control unit changes a speed profile with which a target speed of the driving unit is determined in response to the stop position accuracy required for the target stop position.

5. The servo control device according to claim 1, wherein the servo control unit detects an error between the target stop position and an actual stop position of the driven body, and corrects the timing of ending the servo control using the detected error.

6. A servo control method comprising:
driving, with a driving unit, a driven body which is configured to form an image;
controlling the driving unit for driving the driven body with a servo control; and
switching a timing of ending the servo control in response to a stop position accuracy for a target stop position of the driven body when the driven body is driven to move.

7. The servo control method according to claim 6,
wherein the driven body is a carriage of an image forming apparatus.

8. The servo control device according to claim 6,
wherein the driven body is a carrying unit.

9. The servo control method according to claim 6,
wherein the servo control unit changes a speed profile with which a target speed of the driving unit is determined in response to the stop position accuracy required for the target stop position.

10. The servo control method according to claim 6,
wherein the controlling includes detecting an error between the target stop position and an actual stop position of the driven body, and correcting the timing of ending the servo control using the detected error.

11. A non-transitory recording medium storing a program representing a sequence of instructions, the instructions which, when executed by a computer connected to a driving unit which drives a driven body configured to form an image, causes the computer to function as:

a servo control unit configured to control the driving unit for driving the driven body with a servo control; and a switching unit configured to switch a timing of ending the servo control in response to a stop position accuracy for a target stop position of the driven body when the driven body is driven to move.

12. The non-transitory recording medium according to claim 11,
wherein the driven body is a carriage of an image forming apparatus.

13. The non-transitory recording medium according to claim 11,
wherein the driven body is a carrying unit.

14. The non-transitory recording medium according to claim 11,
wherein the computer functioning as the servo control unit changes a speed profile with which a target speed of the driving unit is determined in response to the stop position accuracy required for the target stop position.

15. The non-transitory recording medium according to claim 11,
wherein the computer functioning as the servo control unit detects an error between the target stop position and an actual stop position of the driven body, and corrects the timing of ending the servo control using the detected error.

* * * * *